March 29, 1927.
V. BOURDON
1,622,486
ADJUSTABLE MIRROR BRACKET
Filed April 1, 1925
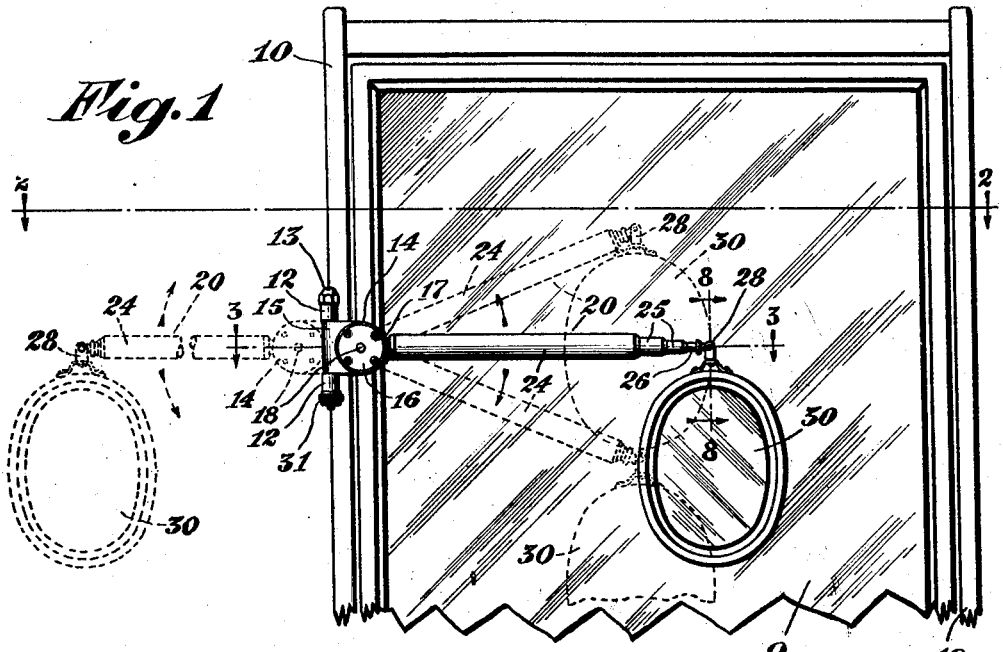
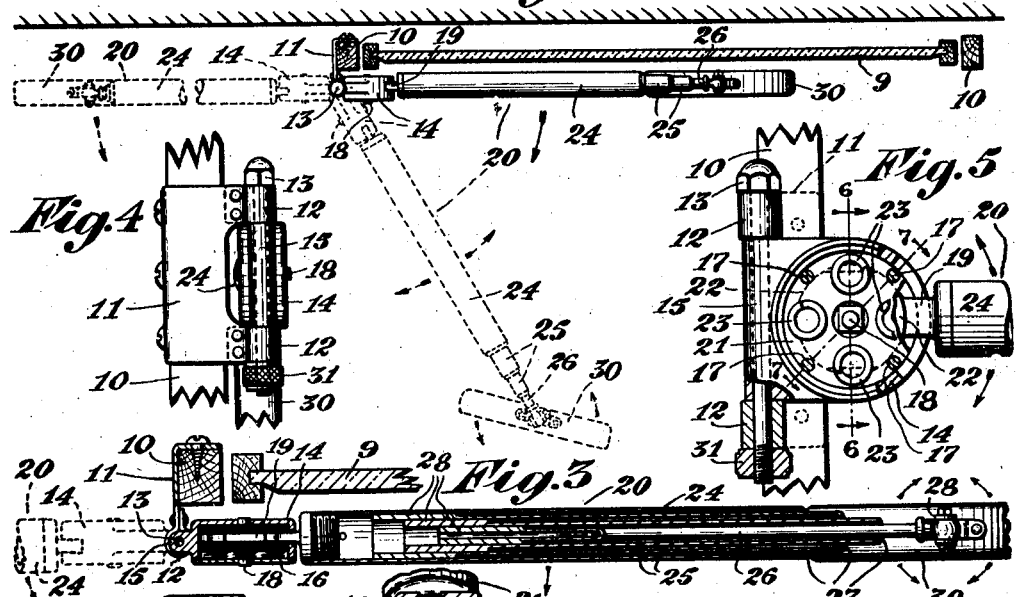
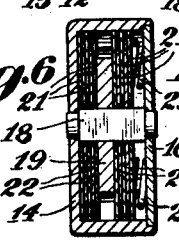
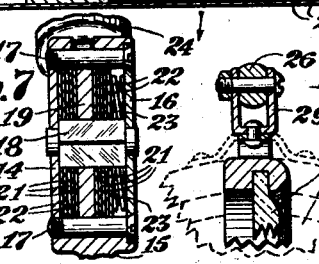
INVENTOR
Victor Bourdon.
BY
James E. Sproll
ATTORNEY.

Patented Mar. 29, 1927.

1,622,486

UNITED STATES PATENT OFFICE.

VICTOR BOURDON, OF SEATTLE, WASHINGTON.

ADJUSTABLE MIRROR BRACKET.

Application filed April 1, 1925. Serial No. 19,857.

This invention relates to improvements in adjustable mirror-brackets, having more particular reference to improvements in the adjustable mirror bracket shown and described in my separate co-pending application Serial No. 17,252 for United States Letters Patent for improvements in adjustable mirror-brackets, and the primary aim and object of the present invention is the provision of a more compact and simplified type of adjustable mirror-bracket wherein the correlated mirror supporting arm is interconnected with the fixed base of said bracket for horizontal and vertical swinging movement relative thereto, and wherein novel friction mechanism is employed to restrainingly engage and retain or maintain said arm in any selected vertically adjusted position or at any desired degree of vertical adjustment relative to said fixed base.

With these and other ends in view the invention essentially resides and is primarily concerned in the provision of a telescopic adjustable mirror-bracket designed to be attached to a large or main mirror, to thereby positively retain and maintain a small mobile mirror in any desired position or degree of horizontal and vertical adjustment relative thereto, and in the preferred embodiment is characterized by the employment of a fixed bifurcated base having a cylindrical casing interconnected therewith and interposed therebetween for horizontal swinging movement relative thereto; a concentrically disposed pin journalled for oscillatory movement within the end walls of said casing; a telescopic mirror supporting arm slidably mounted at the inner end thereof upon said pin for oscillatory movement therewith and vertical swinging movement relative to said casing; a series of friction disks, of relatively hard material, slidably mounted for axial movement within said casing and upon said pin; means to retain said friction disks against rotative movement within said casing and oscillatory movement with said pin; a second series of friction disks, of relatively soft material, slidably mounted upon said pin for oscillatory movement therewith and alternately interposed between the disks of said first series for similar movement relative thereto, the innermost disk of said first series restrainingly engaging and frictionally retaining said mirror supporting arm at the desired degree of vertical adjustment relative to the fixed base thereof; resilient means interposed between the outermost disk of said first series, whereby the disks of both series are maintained and retained in abutting frictional relation and in similar relation to the inner end of said supporting arm; a mobile mirror pivotally and swivelly connected to the outer end of said supporting arm; and novel adjusting means to vary the friction between said fixed bifurcated base and the correlated cylindrical casing interconnected therewith and interposed therebetween, whereby said casing and the associated mirror supporting arm thereof are retained in any desired horizontal angular position relative to said bifurcated base.

The invention further resides in the novel construction, combination, adaptation and arrangement of parts, as will hereinafter be more fully described and succinctly defined in the claims appended hereunto.

Referring now to the accompanying drawings, wherein is illustrated the specific form of the invention, as at present preferred:—

Figure 1 is an elevation of a telescopic adjustable mirror-bracket fabricated in accordance with the invention, as it would appear when operatively secured to the correlated large mirror thereof, and disposed in spaced parallel relation thereto, dotted lines therein indicating certain selected adjusted positions of the mirror supporting arm and the correlated parts thereof relative to the point of attachment of the mirror-bracket.

Fig. 2 is a horizontal section taken through 2—2 of Fig. 1, dotted lines therein indicating certain horizontally adjusted positions of the mirror supporting arm and correlated parts thereof relative to the point of attachment of the mirror-bracket.

Fig 3 is a similar section taken through 3—3 of Fig. 1, with certain parts in elevation.

Fig 4 is an end elevation of the adjustable mirror-backet, as it would appear when swung inwardly.

Fig. 5 is an enlarged fragmentary elevation of the inner end of the adjustable mirror-bracket, with certain parts omitted and certain other parts broken away and in section for clarity of illustration.

Fig. 6 is an enlarged fragmentary transverse vertical section of the mirror-bracket friction mechanism, taken through 6—6 of Fig. 5.

Fig. 7 is a similar section taken through 7—7 of Fig. 5, and

Fig. 8 is an enlarged fragmentary transverse vertical section, of the combined pivotal and swivel mechanism interconnecting the mobile mirror and correlated supporting arm thereof, taken through 8—8 of Fig. 1.

In the drawings similar reference characters designate similar parts throughout the several views.

The numeral 9 designates a large or main mirror provided with a frame 10, to which is rigidly secured, upon one of the uprights thereof, a vertically disposed angularly shaped base member 11, of the adjustable mirror-bracket, having the forward edge of the lateral flange or web thereof bifurcated and the bifurcated portions of said flange projecting forwardly from the frame 10, whereat said bifurcated portions are bent and secured upon themselves to form loops or eyes 12, through which a threaded hinge pin or bolt 13 extends.

The numeral 14 designates a cylindrical casing provided upon the periphery thereof with a tangentially and inwardly extending apertured boss or lug 15 designed to be interposed between the eyes 12 and having the hinge pin 13 extend therethrough, whereby the casing 14 is mounted thereon for horizontal swinging movement relative to the fixed base member 11. The casing 14 upon the open end thereof is provided with a cover or disk-like closure 16 adapted to seat within said end in flush relation therewith, as shown more clearly in Figs. 6 and 7, and to be retained in seated or flushed relation therein by screws or pins 17 threadably engaged at the inner ends thereof within the end wall of the casing 16, as shown in Fig. 7.

Concentrically disposed within the casing 14 is a square pin 18 having the cylindrical ends thereof, respectively, journalled for oscillatory movement within the end wall of said casing 14 and the casing cover 16.

Insertible within and removable from the casing 14 through the slotted cylindrical walls thereof is an ear or disk-like member 19 secured to and constituting the inner terminal of a telescopic mirror supporting arm 20. The ear 19 is concentrically apertured to conform to the shape of and to fit upon the square pin 18 for axial sliding movement thereon and oscillative movement therewith, as more clearly shown in Figs. 6 and 7.

Concentrically disposed within the casing 14 and arranged upon each side of the ear in axial alignment therewith is a series of non-oscillative friction disks 21, preferably of relatively hard material, such as steel or the like, which are retained against oscillative movement within the casing 14 by the screws 17 passing therethrough, as shown more clearly in Figs. 5 and 7. The non-oscillative disks 21 are concentrically apertured to fit freely over the corners of the square pin 18 for axial sliding movement thereon and are also arranged for similar movement upon the screws 17. It will be noted by referring to Figs. 5, 6 and 7 that by fabricating the disks 21 in the manner herein disclosed and described the square pin 18 is disposed for independent oscillative movement therein.

Similarly disposed within the casing 14 and arranged upon each side of the ear 19 in axial alignment therewith is a series of oscillative friction disks 22, preferably of relatively soft material, such as brass or the like, the diameter of which is slightly smaller than the non-oscillating disks 21, so that the disks 22 may be interposed between the screws 17, as shown in Fig. 5, for independent oscillative movement relative thereto. The oscillative disks 22 are concentrically apertured to conform to the shape of and to fit upon the square pin 18 for axial sliding movement thereon and oscillative movement therewith, as more clearly shown in Figs. 6 and 7, and are designed to be alternately interposed between the non-oscillative disks 21 for axial sliding movement therewith and oscillative movement relative thereto.

As herein disclosed and described the ear 19 and the disks 22 are mounted upon the square pin 18 for oscillative movement therewith, while the disks 21 are retained against oscillation, and in this connection reference is again directed to Fig. 6, wherein it is shown, that a proportionately greater number of non-oscillative disks 21 are provided than oscillative disks 22, this in order that the innermost disks abutting the oscillative ear 19 are non-oscillative disks 21, also the outermost disks of both series upon each side of the said ear 19 are non-oscillative disks, for a purpose about to be described.

Interposed between the casing cover 16 and the adjacent outermost non-oscillative disk 21 is a series of relatively short helical compression springs 23, by which the non-oscillating disks 21 are maintained and retained in abutting frictional relation with the correlated and co-acting oscillative disks 22 thereof, also the innermost non-oscillative disks 21 are maintained and retained in similar relation with the sides of the ear 19, to thereby restrainingly engage and frictionally retain said ear in any selected oscillated position, as will be readily apparent and manifest by referring to Figs. 6 and 7. In practice I have found that by fabricating the non-oscillative disks 21 from steel and the correlated and co-acting oscillative disks 22 thereof from brass, as hereinbefore set forth, that the requisite amount of friction therebetween is secured and provided.

The telescopic mirror supporting arm 20, secured at the inner end thereof to the oscillative ear 19 for vertical swinging movement relative to the casing 14, comprises a plurality of telescopic tubular sections including an outer section or casing 24, intermediate telescopic sections 25, and an inner telescopic section 26. The several sections of the arm 20 are held against separation or disengagement by crimping the outer ends of the sections 24 and 25, as shown at 27 in Fig. 3, and providing the rear or inner ends of the sections 25 and 26 with portions 28, of slightly larger diameter, the forward or outer ends of which are designed to abut the crimped ends 27 of the sections 24 and 25, when the several telescopic sections of the arm 20 are fully extended, to thus prevent disengagement or dislodgment of said sections, as will be readily apparent and obvious. The enlarged portions 28 formed upon the rear or inner ends of the sections 25 and 26, also function and serve as guides for said ends and maintain the same in coaxial relation during telescopic movement of said sections 25 and 26, as will be manifest by referring to Fig. 3.

Pivotally connected to the outer terminal of the inner telescopic section 26, of the arm 20, is a clevis 29 and swivelly mounted upon the lower end of the latter is a small mobile mirror 30, whereby the axis of said mirror will always be disposed in a vertical plane, as shown in dotted lines in Fig. 1, and whereby said mirror may be rotated upon the axis thereof to any desired degree or angle of adjustment in a horizontal plane, as shown in dotted lines in Figs. 2 and 3, regardless of the angular position assumed by the correlated supporting arm 20 thereof.

To vary the friction between the eyes 12, of the bifurcated base member 11 and the interposed tangential boss 15, of the casing 14, mounted upon the hinge pin 13, an adjusting nut 31 is threadably mounted upon the lower projecting threaded end of said pin, and is tightened thereon, to thereby frictionally retain and maintain the casing 14 and the telescopic mirror supporting arm 20 in a selected or desired angular position in a horizontal plane, as indicated in dotted lines in Fig. 2, regardless of whether the frame 10, of the large mirror 9, is in a true vertical plane or is out of plumb.

In the drawings I have illustrated the adjustable mirror-bracket of the invention, as adjustably secured to the left-hand upright of the mirror frame 10, but, obviously, the said mirror-bracket may be mounted upon the right-hand upright of said frame 10, by attaching the base member 11 thereto and will function with equal and uniform efficiency thereat, as in the manner herein disclosed and described.

Manifestly therefore, in the construction herein shown and described, the small mobile mirror 30 is supported for horizontal and vertical swinging movement relative to the base member 11, for movement toward and away from said base member, and for pivotal and swivel movement relative to the correlated supporting arm 20 thereof, whereby any desired position or degree of adjustment may be secured for the small mobile mirror 30 relative to the associated large mirror 9 thereof, or the said small mobile mirror 30 may be swung to an inoperative position relative to the mirror 9, as indicated in dotted lines in Figs. 1, 2 and 3.

By employing the several series of coacting and correlated non-oscillative friction disks 21 and 22, in conjunction with the oscillative supporting arm 20, vertical adjustment of said arm is readily and rapidly effected and the friction maintained, by the springs 23, between said non-oscillative and oscillative disks and said arm, will positively retain the latter in any selected or desired position, further any degree of vertical adjustment of the arm 20 from the minimum to the maximum may be obtained therefor, as will be readily apparent and obvious.

It will be observed by referring to the accompanying drawings, that by fabricating the present structure in the manner herein disclosed and described, that the assembly of the several parts thereof may be expeditiously and rapidly effected and the assembled mirror bracket readily attached to or detached from the associated frame 10, and when necessary the dismantling of the structure may be similarly performed.

While I have herein shown and described the invention with sufficient detail to enable those skilled in the art to understand the mode of construction and the principles involved, it is to be understood that there is no intentional limitation herein to the specific form and precise details of construction of the invention shown and described, except as expressly defined by the appended claims, and that various modifications of said construction may be resorted to without departing from the invention or the benefits derivable therefrom. I also desire it to be understood that certain features of the invention herein shown and described may be employed in other combinations than those herein shown.

Having thus fully described my invention, what I claim as new and desire to secure by Letters Patent of the United States of America is:—

1. In an adjustable mirror-bracket, in combination, a fixed base, a vertically disposed hinge pin mounted therein, a horizontally swinging casing mounted upon said hinge pin, a vertically swinging mirror supporting arm pivotally connected within said casing for horizontal swinging movement therewith, and frictional means disposed within said casing for restrainingly engaging and retaining said arm in selective vertically adjustable positions relative to the casing.

2. In an adjustable mirror-bracket, in combination, a fixed base, a vertically disposed hinge pin mounted therein, a horizontally swinging casing mounted upon said hinge pin, a vertically swinging mirror supporting arm pivotally connected within said casing for horizontal swinging movement therewith, and a series of friction disks disposed within said casing for restrainingly engaging and retaining said arm in selective vertically adjustable positions relative to the casing.

3. In an adjustable mirror-bracket, in combination, a fixed base, a vertically disposed hinge pin mounted therein, a horizontally swinging casing mounted upon said hinge pin, a concentrically disposed pin journalled for oscillatory movement within the end walls of said casing, a mirror supporting arm mounted upon said pin for vertical swinging movement relative to said casing and horizontal swinging movement therewith, a series of co-acting friction disks concentrically disposed within said casing and slidably mounted for axial movement upon said pin having alternate disks of the series mounted thereon for oscillatory movement relative to the correlated alternating disks thereof, and means for maintaining the disks of said series in abutting frictional relation and the innermost disk of the series in frictional engagement with said supporting arm for retaining the same in selective vertically adjustable positions relative to said casing.

4. In an adjustable mirror-bracket, in combination, a fixed base, a vertically disposed hinge pin mounted therein, a horizontally swinging casing mounted upon said hinge pin, a concentrically disposed square pin having the ends thereof journalled for oscillatory movement within the end walls of said casing, a mirror supporting arm mounted upon said pin for vertical swinging movement relative to said casing and horizontal swinging movement therewith, a series of non-oscillative friction disks concentrically disposed within said casing and slidably mounted for axial movement upon said square pin, a series of co-acting oscillative friction disks concentrically disposed within said casing and mounted upon said square pin for axial sliding movement thereon and oscillatory movement therewith, said oscillative disks being alternately interposed between said non-oscillative disks for axial sliding movement therewith and for oscillatory movement relative thereto, and means interposed between the outermost non-oscillative disk and the adjacent end wall of said casing for maintaining the non-oscillative and oscillative disks in abutting relation and the innermost non-oscillative disk in frictional engagement with said supporting arm for retaining the latter in any degree of vertical adjustment relative to said casing.

5. In an adjustable mirror-bracket, in combination, a fixed angular base having a bifurcated forward end, a hinge pin mounted within said bifurcated end, a cylindrical casing mounted upon said hinge pin and interposed within said bifurcated end for horizontal swinging movement relative thereto, a concentrically disposed square pin having the ends thereof journaled for oscillatory movement within the end walls of said casing, an adjustable telescopic mirror supporting arm slidably mounted at the inner end thereof upon said square pin for oscillatory movement therewith and vertical swinging movement relative to said casing, a series of non-oscillative friction disks of relatively hard material concentrically disposed within said casing upon each side of said arm and slidably mounted for axial movement upon said square pin, means to retain said non-oscillative disks against oscillation within said casing and with said square pin, a series of co-acting oscillative disks of relatively soft material concentrically disposed within said casing upon each side of said arm and mounted upon said square pin for axial sliding movement thereon and oscillatory movement therewith adapted to be alternately interposed between said non-oscillative disks for axial sliding movement therewith and for oscillatory movement relative thereto, resilient means interposed between the outermost non-oscillative disk of one of said series of non-oscillative disks and the adjacent end wall of said casing whereby the non-oscillative and oscillative disks of both series disposed upon each side of said arm are maintained in abutting frictional relation and the innermost non-oscillative disks of both series are maintained in frictional engagement with the sides of the inner terminal of said arm to retain the said arm in any desired degree of vertical adjustment relative to said casing, and a mobile mirror pivotally and swivelly mounted upon the outer end of said arm.

In testimony whereof I affix my signature.

VICTOR BOURDON.